United States Patent [19]

Simpson et al.

[11] Patent Number: 4,650,718

[45] Date of Patent: Mar. 17, 1987

[54] COLOR PLUS CLEAR COATINGS EMPLOYING POLYEPOXIDES AND POLYACID CURING AGENTS

[75] Inventors: Dennis A. Simpson, Koppel; Debra L. Singer, Pittsburgh; Rostyslaw Dowbenko, Gibsonia; William P. Blackburn, Evans City; Charles M. Kania, Tarentum, all of Pa.

[73] Assignee: PPG Industries, Inc., Pittsburgh, Pa.

[21] Appl. No.: 767,020

[22] Filed: Aug. 19, 1985

[51] Int. Cl.$^4$ .................. B05D 1/36; B05D 7/00; B32B 15/08; B32B 27/38
[52] U.S. Cl. .................... 428/413; 427/407.1; 427/410; 428/414; 428/416; 428/418; 528/112
[58] Field of Search .............. 427/409, 410, 407.1; 428/413, 414, 416, 418; 528/112

[56] References Cited

U.S. PATENT DOCUMENTS

| | | | |
|---|---|---|---|
| 2,683,131 | 7/1954 | Cass | 260/45.4 |
| 2,712,535 | 7/1955 | Fisch | 260/45.4 |
| 2,857,354 | 10/1958 | Fang | 260/33.2 |
| 2,890,194 | 6/1959 | Phillips et al. | 260/45.4 |
| 2,890,210 | 6/1959 | Phillips et al. | 260/78.4 |
| 3,008,914 | 11/1961 | Fry | 260/33.4 |
| 3,179,714 | 4/1965 | Brockman et al. | 260/837 |
| 3,215,756 | 11/1965 | Lombardi et al. | 260/834 |
| 3,218,274 | 11/1965 | Boller et al. | 260/22 |
| 3,269,975 | 8/1966 | Lee | 260/37 |
| 3,408,215 | 10/1968 | Wismer et al. | 106/252 |
| 3,523,143 | 8/1970 | Kwong | 260/835 |
| 3,528,935 | 9/1970 | Marion et al. | 260/23 |
| 3,758,635 | 9/1973 | Labana et al. | 260/836 |
| 3,781,380 | 12/1973 | Labana et al. | 260/836 |
| 3,787,521 | 1/1974 | Labana et al. | 260/836 |
| 3,925,507 | 12/1975 | Katsimbas | 260/836 |
| 3,932,367 | 1/1976 | Labana et al. | 260/78.4 D |
| 3,953,644 | 4/1976 | Camelon et al. | 428/220 |
| 3,954,712 | 5/1976 | Lottanti et al. | 260/47 EA |
| 3,975,314 | 8/1976 | Smyk et al. | 260/2 EP |
| 4,046,727 | 9/1977 | Itoh et al. | 260/28.5 R |
| 4,102,942 | 7/1978 | Smith et al. | 260/836 |
| 4,226,755 | 10/1980 | Knecht | 260/31.4 EP |
| 4,291,137 | 9/1981 | Nakate et al. | 525/162 |
| 4,346,144 | 8/1982 | Craven | 428/335 |
| 4,350,790 | 9/1982 | Chattha | 525/110 |
| 4,355,071 | 10/1982 | Chang | 427/410 X |
| 4,359,554 | 11/1982 | Labana et al. | 525/386 |
| 4,403,093 | 9/1983 | Hartman et al. | 528/297 |
| 4,418,182 | 11/1983 | Chattha | 427/410 X |
| 4,465,815 | 8/1984 | Chattha | 428/460 X |
| 4,471,025 | 9/1984 | Bernelin et al. | 428/413 |
| 4,548,963 | 10/1985 | Cluff et al. | 523/427 |

FOREIGN PATENT DOCUMENTS

| | | |
|---|---|---|
| 84/00768 | 3/1984 | PCT Int'l Appl. . |
| 84/00770 | 3/1984 | PCT Int'l Appl. . |
| 84/00771 | 3/1984 | PCT Int'l Appl. . |

OTHER PUBLICATIONS

Handbook of Epoxy Resins, by Lee and Neville, McGraw-Hill Book Co., 1967, Chapter 11.

*Primary Examiner*—Michael R. Lusignan
*Attorney, Agent, or Firm*—William J. Uhl

[57] ABSTRACT

A color-plus-clear coating system is disclosed. A pigmented or colored base coat is first applied to a substrate followed by the application of a transparent top coat to the base coat. Either the transparent top coat, the base coat or both the top coat and base coat compositions are crosslinkable compositions comprising a polyepoxide and a polyacid curing agent which comprises a half-ester formed from reacting an acid anhydride with a polyol. The polyepoxide-polyacid curing agent in the transparent top coat provides a composite coating with outstanding gloss and distinctness of image making the composite coating particularly useful as an automotive top coat.

27 Claims, No Drawings

COLOR PLUS CLEAR COATINGS EMPLOYING POLYEPOXIDES AND POLYACID CURING AGENTS

CROSS-REFERENCE TO RELATED APPLICATION

Reference is made to application Ser. No. 767,019, filed on Aug. 19, 1985. This application claims liquid crosslinkable compositions which are useful in the process of the present invention.

BACKGROUND OF THE INVENTION

1. Field of the Invention:

The present invention relates to a process for preparing multi-layered coated articles comprising a pigmented or colored base coat and a transparent or clear top coat, and to the coated articles themselves.

2. Brief Description of the Prior Art:

Color-plus-clear coating systems involving the application of a colored or pigmented base coat to a substrate followed by the application of a transparent or clear top coat to the base coat are becoming increasingly popular as original finishes for automobiles. The color-plus-clear systems have outstanding gloss and distinctness of image, and the clear coat is particularly important for these properties. Two-pack clear coat compositions comprising polyols such as polyester polyols, polyurethane polyols and acrylic polyols and polyisocyanate curing agents give outstanding gloss and distinctness of image. However, the polyisocyanates are difficult to handle being sensitive to moisture and require cumbersome safety precautions.

It is an object of the present invention to provide a color-plus-clear coating system which avoids the problems of polyisocyanate curing agents but which provides a finish which has outstanding gloss and distinctness of image so that the coating is useful as an original finish for automobiles.

SUMMARY OF THE INVENTION

In accordance with the present invention, a process for applying a composite coating to a substrate is provided. The process comprises applying to the substrate a film-forming composition to form a base coat and applying to the base coat a film-forming composition to form a transparent top coat over the base coat. Either the base coat, the transparent top coat or both the base and top coats are derived from a crosslinkable composition comprising a polyepoxide and a polyacid curing agent which comprises a half-ester formed from reacting an acid anhydride with a polyol. The curing agent can be tailor made with specific anhydrides and polyols without forming high molecular weight materials enabling the formulation of high solids coating compositions which provide cured coatings with excellent gloss and distinctness of image. The invention also provides for the resultantly coated article.

DETAILED DESCRIPTION

The film-forming composition of the base coat can be any of the compositions useful in coatings applications, particularly automotive applications. The film-forming composition comprises a resinous binder and a pigment to act as the colorant. Particularly useful resinous binders are acrylic polymers, polyesters, including alkyds, and polyurethanes.

The acrylic polymers are copolymers of one or more alkyl esters of acrylic acid or methacrylic acid optionally together with one or more other polymerizable ethylenically unsaturated monomers. These polymers may be either of the thermoplastic type or thermosetting crosslinking type. Suitable alkyl esters of acrylic acid or methacrylic acid include methyl methacrylate, ethyl methacrylate, butyl methacrylate, ethyl acrylate, butyl acrylate and 2-ethylhexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

Where the polymer is of the crosslinking type, suitable functional monomers may be used in addition to the other acrylic monomers mentioned above and include, for example, acrylic acid, methacrylic acid, hydroxyethyl acrylate, hydroxyethyl methacrylate, hydroxypropyl acrylate, and hydroxypropyl methacrylate. The coating composition in such cases contains a crosslinking agent such as a condensate of an amine or an amide with formaldehyde such as urea, melamine, or benzoguanamine reacted with formaldehyde or a lower alkyl ether of such condensate in which the alkyl groups contain from 1 to 4 carbon atoms. Other crosslinking agents such as polyisocyanates including blocked polyisocyanates may also be used. Also, the acrylic polymer can be prepared with N-(alkoxymethyl)-acrylamides and N-(alkoxymethyl)methacrylamides which result in self-crosslinking acrylic polymers.

The acrylic polymer may be prepared by solution polymerization techniques in the presence of suitable catalysts such as organic peroxides or azo compounds, for example, benzoyl peroxide or N,N'-azobis-(isobutyronitrile). The polymerization can be carried out in an organic solution in which the monomers are soluble. Suitable solvents are aromatic solvents such as xylene and toluene and ketones such as methyl amyl ketone. Alternately, the acrylic polymer may be prepared by aqueous emulsion or dispersion polymerization techniques.

Besides acrylic polymers, the resinous binder for the base coat composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylolpropane, and pentaerythritol.

Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the polycarboxylic acids such as anhydrides where they exist or lower alkyl esters of the polycarboxylic acids such as the methyl esters may be used.

Where it is desired to produce air-drying alkyd resins, suitable drying oil fatty acids may be used and include those derived from linseed oil, soya bean oil, tall oil, dehydrated castor oil or tung oil.

The polyesters and preferably the alkyd resins contain a portion of free hydroxyl and/or carboxyl groups which are available for further crosslinking reaction. Suitable crosslinking agents are the amine or amidealdehyde condensates or the polyisocyanate curing agents as mentioned above.

Polyurethanes can also be used as the resinous binder of the base coat. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product.

The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

Most of the polymers prepared as described above are organic solvent-based polymers, although acrylic polymers can be prepared via aqueous emulsion polymerization techniques and used as aqueous-based base coat compositions. Water-based base coats in colorplus-clear compositions are disclosed in U.S. Pat. No. 4,403,003, and the resinous compositions used in preparing these base coats can be used in the practice of this invention. Also, water-based polyurethanes such as those prepared in accordance with U.S. Pat. No. 4,147,679 can be used as the resinous binder in the base coat.

The resinous binder for the base coat can also be the resinous binder used in formulating the clear film-forming composition described below.

The base coat composition also contains pigments to give it color. Compositions containing metallic flake pigmentation are useful for the production of so-called "glamour metallic" finishes chiefly upon the surface of automobile bodies. Proper orientation of the metallic pigments results in a lustrous shiny appearance with excellent flop, distinctness of image and high gloss. By flop is meant the visual change in brightness or lightness of the metallic coating with a change in viewing angle, that is, a change from 90° to 180°. The greater the change, that is, from light to dark appearance, the better the flop. Flop is important because it accentuates the lines of a curved surface such as on an automobile body. Suitable metallic pigments include in particular aluminum flake, copper bronze flake and mica.

Besides the metallic pigments, the base coating compositions of the present invention may contain non-metallic color pigments conventionally used in the surface coating compositions including inorganic pigments such as titanium dioxide, iron oxide, chromium oxide, lead chromate and carbon black, and organic pigments such as phthalocyanine blue and phthalocyanine green. In general, the pigment is incorporated into the coating composition in amounts of about 1 to 80 percent by weight based on weight of coating solids. The metallic pigment is employed in amounts of about 0.5 to 25 percent by weight of the aforesaid aggregate weight.

If desired, the base coat composition may additionally contain other materials well known in the art of formulated surface coatings. These would include surfactants, flow control agents, thixotropic agents, fillers, anti-gassing agents, organic co-solvents, catalysts and other customary auxiliaries. These materials can constitute up to 40 percent by weight of the total weight of the coating composition.

The base coating compositions can be applied to various substrates to which they adhere. The compositions can be applied by conventional means including brushing, dipping, flow coating, spraying and the like, but they are most often applied by spraying. The usual spray techniques and equipment for air spraying and electrostatic spraying and either manual or automatic methods can be used.

Coatings of the present invention can be applied over virtually any substrate including wood, metals, glass, cloth, plastic, foam, including elastomeric substrates, and the like. They are particularly useful in applying over metal and elastomeric substrates that are found on motor vehicles.

During application of the base coat composition to the substrate, a film of the base coat is formed on the substrate. Typically, the base coat thickness will be about 0.01 to 5, preferably 0.1 to 2 mils in thickness.

After application to the substrate of the base coat composition, a film is formed on the surface of the substrate. This is achieved by driving solvent, i.e., organic solvent or water, out of the base coat film by heating or simply by an air-drying period. Preferably, the heating step will only be sufficient and for a short period of time to insure that the top coat composition can be applied to the base coat without the former dissolving the base coat composition, i.e., "striking in". Suitable drying conditions will depend on the particular base coat composition, on the ambient humidity with certain water-based compositions, but in general a drying time of from about 1 to 5 minutes at a temperature of about 80°-175° F. (20°-79° C.) will be adequate to insure that mixing of the two coats is minimized. At the same time, the base coat film is adequately wetted by the top coat composition so that satisfactory intercoat adhesion is obtained. Also, more than one base coat and multiple top coats may be applied to develop the optimum appearance. Usually between coats, the previously applied base coat or top coat is flashed, that is, exposed to ambient conditions for about 1 to 20 minutes.

The clear film-forming composition which forms the transparent top coat is preferably a crosslinkable composition comprising a polyepoxide and a polyacid which comprises a half-ester formed from reacting an acid anhydride with a polyol.

Among the polyepoxides which can be used are epoxy-containing acrylic polymers which are preferred, epoxy condensation polymers such as polyglycidyl ethers of alcohols and phenols and certain polyepoxide monomers and oligomers.

The epoxy-containing acrylic polymer is a copolymer of an ethylenically unsaturated monomer having at least one epoxy group and at least one polymerizable ethylenically unsaturated monomer which is free of epoxy groups.

Examples of ethylenically unsaturated monomers containing epoxy groups are those containing 1,2-epoxy groups and include glycidyl acrylate, glycidyl methacrylate and allyl glycidyl ether.

Examples of ethylenically unsaturated monomers which do not contain epoxy groups are alkyl esters of acrylic and methacrylic acid containing from 1 to 20 atoms in the alkyl group. Specific examples of these acrylates and methacrylates are those mentioned above in connection with the acrylic polymers for the base coat. Examples of other copolymerizable ethylenically unsaturated monomers are vinyl aromatic compounds, nitriles, vinyl and vinylidene halides and vinyl esters such as those mentioned above. Acid group-containing copolymerizable ethylenically unsaturated monomers such as acrylic and methacrylic acid are preferably not used because of the possible reactivity of the epoxy and acid group.

The epoxy group-containing ethylenically unsaturated monomer is preferably used in amounts of from about 5 to 60, more preferably from 20 to 50 percent by weight of the total monomers used in preparing the epoxy-containing acrylic polymer. Of the remaining polymerizable ethylenically unsaturated monomers, preferably from 40 to 95 percent, more preferably from 50 to 80 percent by weight of the total monomers are the alkyl esters of acrylic and methacrylic acid.

In preparing the epoxy-containing acrylic polymer, the epoxide functional monomers and the other ethylenically unsaturated monomers can be mixed and reacted by conventional free radical initiated organic solution polymerization as generally described above.

The epoxy-containing acrylic polymer typically has a number average molecular weight between about 1000 and 20,000, preferably 1000 to 10,000, and more preferably 1000 to 5000. The molecular weight is determined by gel permeation chromatography using a polystyrene standard. In determining molecular weights in this fashion, it is not the actual molecular weights which are measured but an indication of the molecular weight as compared to polystyrene. The values which are obtained are commonly referred to as polystyrene numbers. However, for the purposes of this invention, they are referred to as molecular weights.

The epoxy condensation polymers which are used are polyepoxides, that is, those having a 1,2-epoxy equivalency greater than 1, preferably greater than 1 and up to about 3.0. Examples of such epoxides are polyglycidyl ethers of polyhydric phenols and of aliphatic alcohols. These polyepoxides can be produced by etherification of the polyhydric phenol or aliphatic alcohol with an epihalohydrin such as epichlorohydrin in the presence of alkali.

Examples of suitable polyphenols are 2,2-bis(4-hydroxyphenyl)-propane (bisphenol A), 1,1-bis(4-hydroxyphenyl)ethane and 2-methyl-1,1-bis(4-hydroxyphenyl)propane. Examples of suitable aliphatic alcohols are ethylene glycol, diethylene glycol, 1,2-propylene glycol and 1,4-butylene glycol. Also, cycloaliphatic polyols such as 1,2-cyclohexanediol, 1,4-cyclohexanediol, 1,2-bis(hydroxymethyl)cyclohexane and hydrogenated bisphenol A can also be used.

Besides the epoxy-containing polymers described above, certain polyepoxide monomers and oligomers can also be used. Examples of these materials are described in U.S. Pat. No. 4,102,942 in column 3, lines 1–16. Specific examples of such low molecular weight polyepoxides are 3,4-epoxycyclohexylmethyl 3,4-epoxycyclohexanecarboxylate and bis(3,4-epoxy-6-methyl-cyclohexyl-methyl) adipate. These materials are aliphatic polyepoxides as are the epoxy-containing acrylic polymers. As mentioned above, the epoxy-containing acrylic polymers are preferred because they result in products which have the best combination of coating properties, i.e., smoothness, gloss, durability and solvent resistance. Such polymers have been found to be particularly good in the formulation of clear coats for color-plus-clear applications.

The polyepoxide is present in the liquid crosslinkable composition in amounts of about 10 to 90, preferably from 25 to 75 percent by weight based on total weight of resin solids.

The polyacid contains two or more acid groups per molecule which are reactive with the polyepoxide to form a crosslinked coating as indicated by its resistance to organic solvent. It comprises a half-ester formed from reacting an acid anhydride with a polyol. The acid functionality is preferably carboxylic acid, although acids such as sulfonic acid may be used but their use is not preferred. The half-esters are relatively low in molecular weight and quite reactive with epoxies enabling the formulation of high solids fluid compositions while maintaining outstanding properties such as gloss and distinctness of image.

The half-ester is obtained by reaction between a polyol and a 1,2-acid anhydride under conditions sufficient to ring open the anhydride forming the half-ester with substantially no polyesterification occurring. Such reaction products are of relatively low molecular weight with narrow molecular weight distributions and provide lower volatile organic contents in the coating composition while still providing for excellent properties in the resultant coating. By substantially no polyesterification occurring means that the carboxyl groups of the anhydride are not esterified by the polyol in a recurring manner. By this is meant that less than 10, preferably less than 5 percent by weight polyester is formed.

Two reactions may occur in combining the anhydride and the polyol together under suitable reaction conditions. The desired reaction mode involves ring opening the anhydride ring with hydroxyl, i.e.,

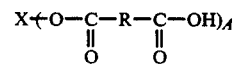

where X is the residue of the polyol after reaction with the 1,2-dicarboxylic acid anhydride, R is an organic moiety associated with the anhydride and A is equal to at least 2.

Subsequently, carboxyl groups formed by opening of the anhydride ring may react with hydroxyl groups to give off water via a condensation reaction. This latter reaction is not desired since it can lead to a polycondensation reaction resulting in products with higher molecular weights.

To achieve the desired reaction, the 1,2-acid anhydride and polyol are contacted together usually by mixing the two ingredients together in a reaction vessel. Preferably, reaction is conducted in the presence of an inert atmosphere such as nitrogen and in the presence of a solvent to dissolve the solid ingredients and/or to lower the viscosity of the reaction mixture. Examples of suitable solvents are high boiling materials and include, for example, ketones such as methyl amyl ketone, diisobutyl ketone, methyl isobutyl ketone; aromatic hydrocarbons such as toluene and xylene; as well as other organic solvents such as dimethyl formamide and N-methyl-pyrrolidone.

For the desired ring opening reaction and half-ester formation, a 1,2-dicarboxylic anhydride is used. Reaction of a polyol with a carboxylic acid instead of an anhydride would require esterification by condensation eliminating water which would have to be removed by distillation. Under these conditions this would promote undesired polyesterification. Also, the reaction temperature is preferably low, that is, no greater than 135° C., preferably less than 120° C., and usually within the range of 70°-135° C., preferably 90°-120° C. Temperatures greater than 135° C. are undesirable because they promote polyesterification, whereas temperatures less than 70° C. are undesirable because of sluggish reaction.

The time of reaction can vary somewhat depending principally upon the temperature of reaction. Usually the reaction time will be from as low as 10 minutes to as high as 24 hours.

The equivalent ratio of anhydride to hydroxy on the polyol is preferably at least about 0.8:1 (the anhydride being considered monofunctional) to obtain maximum conversion to the desired half-ester. Ratios less than 0.8:1 can be used but such ratios result in increased formation of less preferred half-esters.

Among the anhydrides which can be used in the formation of the desired polyesters are those which exclusive of the carbon atoms and the anhydride moiety contain from about 2 to 30 carbon atoms. Examples include aliphatic, including cycloaliphatic, olefinic and cycloolefinic anhydrides and aromatic anhydrides. Substituted aliphatic and aromatic anhydrides are also included within the definition of aliphatic and aromatic provided the substituents do not adversely affect the reactivity of the anhydride or the properties of the resultant polyester. Examples of substituents would be chloro, alkyl and alkoxy. Examples of anhydrides include succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride and maleic anhydride.

Among the polyols which can be used are those which contain from about 2 to 20 carbon atoms. Preferred are diols, triols and mixtures thereof. Examples include polyols containing from 2 to 10 carbon atoms. Examples include aliphatic polyols such as ethylene glycol, 1,2-propanediol, 1,3-propanediol, 1,4-butanediol, 1,5-pentanediol, glycerol, 1,2,3-butanetriol, 1,6-hexanediol, neopentyl glycol, diethylene glycol, dipropylene glycol, 1,4-cyclohexanedimethanol, trimethylolpropane, 2,2,4-trimethylpentane-1,3-diol, pentaerythritol and 1,2,3,4-butanetetrol. Aromatic polyols such as bisphenol A and bis(hydroxymethyl) xylene can also be used.

The half-ester is present in the coating composition in amounts of about 10 to 90, preferably 25 to 75 percent by weight based on total weight of resin solids.

The polyepoxide and the half-ester are essential ingredients in the crosslinkable composition. However, there are optional materials which are preferred ingredients in the compositions. These include an acid functional acrylic polymer and an anhydride.

The acid functional acrylic polymer provides sag control. The preferred clear film-forming compositions are high solids compositions and have a tendency to sag when applied to vertical surfaces. The acid functional acrylic polymer surprisingly provides sag control to the compositions. The acid functional acrylic polymers are the reaction product of an ethylenically unsaturated polymerizable carboxylic acid such as acrylic acid or methacrylic acid and ethylenically unsaturated polymerizable monomers other than said acids. These products are non-gelled and typically will have number average molecular weights as determined by gel permeation chromatography using a polystyrene standard of from about 500 to 5000, preferably 700 to 3000. The preferred reaction products will also have a uniform molecular weight distribution which is evidenced by polydispersity values which are preferably less than 4, more preferably from 2 to 3. The polydispersity value is the ratio of the weight average molecular weight to the number average molecular weight each being determined by gel permeation chromatography using a polystyrene standard as described above.

The amount of acid functional acrylic polymer which is used can vary from 0 to 50, preferably from 10 to 20 percent by weight based on total weight of resin solids.

The polyepoxide-polyacid compositions also preferably contain an anhydride, preferably an anhydride which is a liquid at 25° C. The presence of such an anhydride in the compositions provides an improved cure response. Examples of suitable anhydrides include alkyl-substituted hexahydrophthalic anhydrides such as methyl hexahydrophthalic anhydride and dodecenyl succinic anhydride. The amount of the anhydride which is used can vary from 0 to 40, preferably from 5 to 25 percent by weight based on total weight of resin solids.

Optionally, the crosslinkable composition can contain silane functionality which can be incorporated into the composition by using a reactive silane group-containing material such as gamma-methacryloxypropyltrimethoxysilane or mercaptopropyltrimethoxysilane which can be used in the preparation of the epoxy group-containing acrylic polymer. Such materials coreact with the polymerizing monomers or polymers forming a polymer with silane curing groups. Alternately, a silane group-containing material such as methyltrimethoxysilane can be included in the composition. The silane functionality results in lower temperature cure.

The equivalent ratio of carboxyl to epoxy in the clear film-forming compositions is preferably adjusted so that there are about 0.3 to 3.0, preferably from 0.8 to 1.5 equivalents of carboxyl (anhydride being considered monofunctional) per equivalent of epoxy.

The compositions will also preferably contain catalysts to accelerate the cure of the epoxy and acid groups. Examples of suitable catalysts include organic amines and quaternary ammonium compounds such as pyridine, piperidine, dimethylaniline, diethylenetriamine, tetramethylammonium chloride, tetramethylammonium acetate, tetramethylbenzylammonium acetate, tetrabutylammonium fluoride, and tetrabutylammonium bromide. The amount of catalyst is typically from 0 to 10, preferably 0.5 to 3 percent by weight based on resin solids.

The polyepoxide-polyacid compositions are preferably formulated into high solids coating compositions. That is, these coating compositions contain greater than 50 percent, most preferably greater than 60 percent by weight resin solids. The solids content is determined by heating the composition to 105°-110° C. for 1 to 2 hours to drive off the volatile material. The compositions are preferably liquid high solids compositions, but they can also be formulated as powder coatings.

Also, optional ingredients such as auxiliary curing agents such as aminoplast resins, plasticizers, anti-oxidants, and UV light absorbers can be included in the composition. These ingredients typically are present in amounts of up to 25 percent by weight based on total resin weight.

Besides the polyepoxide-polyacid compositions described above, the clear coat can be formulated with conventional resinous binders such as the acrylic polymers, polyesters, alkyds and polyurethanes described above in connection with the base coats. In this instance, the base coat will contain polyepoxide-polyacid compositions.

The clear top coat composition can be applied to the base-coated substrate by any of the conventional coating techniques such as brushing, spraying, dipping or flowing, but it is preferred that spray applications be used since this gives the best gloss. Any of the known spray techniques may be employed such as compressed air spraying, electrostatic spraying and either manual or automatic methods.

After application of the top coat composition to the base coat, the coated substrate is heated to cure the coating layers. In the curing operation, solvents are driven off and the film-forming material of the top coat and/or of the base coat is crosslinked with the aid of any crosslinking agents present. The heating or curing operation is usually carried out at a temperature in the range of from 160°–350° F. (71°–177° C.) but if needed lower or higher temperatures may be used depending upon whether it is sufficient to activate any necessary crosslinking mechanisms. The thickness of the top coat is usually from about 1 to 5, preferably 1.2 to 3 mils.

The invention will be further described by reference to the following examples. Unless otherwise indicated, all parts are by weight.

EXAMPLES

The following examples (Examples A–E) show the preparation of epoxy-containing acrylic polymers, polyacid half-esters and an acid-containing acrylic polymer.

EXAMPLE A

An epoxy-containing acrylic polymer was prepared from the following mixture of ingredients:

| Ingredients | Weight in Grams | Percentage by Weight |
|---|---|---|
| Glycidyl methacrylate | 320.0 | 40 |
| Methyl methacrylate | 160.0 | 20 |
| Butyl acrylate | 160.0 | 20 |
| Butyl methacrylate | 160.0 | 20 |
| VAZO-67[1] | 24.0 | 3.0 (on monomers) |
| Tertiary-butyl perbenzoate | 16.0 | 2.0 (on monomers) |
| Tertiary-butyl perbenzoate (post-addition) | 4.0 | 0.5 (on monomers) |
| Tertiary-butyl perbenzoate (post-addition) | 4.0 | 0.5 (on monomers) |

[1]Alpha, alpha'-dimethylazobis(isobutyronitrile) available from E. I. duPont de Nemours and Company.

Xylene (415.3 grams) was charged to a suitable reactor and heated to reflux to remove water through a Dean-Stark trap. The glycidyl methacrylate, methyl methacrylate, butyl acrylate and butyl methacrylate were mixed together. The VAZO-67, first portion of tertiary-butyl perbenzoate and 100 grams of xylene were also premixed together. The premixture of vinyl monomers and the premixture of initiators were added simultaneously to the reaction vessel over a period of about 3 hours while maintaining the reaction temperature at reflux. At the completion of the addition, the reaction mixture was held at reflux for one hour followed by the addition of the second portion of tertiary-butyl perbenzoate and 25 grams of xylene. The reaction mixture was held for one hour at reflux followed by the addition of the third portion of tertiary-butyl perbenzoate and 25 grams of xylene. The reaction mixture was held for two hours at reflux followed by cooling to room temperature. The reaction mixture had a solids content of about 60 percent and a number average molecular weight of 1456 as determined by gel permeation chromatography using a polystyrene standard.

EXAMPLE B

An apoxy-containing acrylic polymer containing silane functionality was prepared from the following mixture of ingredients:

| Kettle Charge | |
|---|---|
| Ingredients | Parts by Weight (in grams) |
| Xylene | 480.0 |

| | Charge I | |
|---|---|---|
| Ingredients | Parts by Weight (in grams) | Percentage by Weight |
| Glycidyl methacrylate | 896.0 | 40.0 |
| Methyl methacrylate | 560.0 | 25.0 |
| Butyl acrylate | 448.0 | 20.0 |
| Gamma-methacryloxy-propyltrimethoxysilane | 336.0 | 15.0 |

| Ingredients | Parts by Weight (in grams) |
|---|---|
| Charge II | |
| Xylene | 288.0 |
| VAZO-67 | 112.0 |
| Charge III | |
| Xylene | 144.0 |
| Mercaptopropyltrimethoxysilane | 112.0 |
| Charge IV | |
| Xylene | 24.0 |
| VAZO-67 | 8.96 |
| Charge V | |
| Xylene | 24.0 |
| VAZO-67 | 8.96 |

The kettle charge was heated to reflux in a suitable reactor to remove water through a Dean-Stark trap. Charges I, II and III were added simultaneously over the period of three hours while maintaining the reaction mixture at reflux. Charge IV was added and the reaction mixture held at reflux for one hour, followed by the addition of Charge V and holding the reaction mixture at reflux for one hour, followed by cooling to room temperature. The reaction mixture had a solids content (150° C.) of 67.7 percent and a number average molecular weight of 1435 as determined by gel permeation chromatography using a polystyrene standard.

EXAMPLE C

An epoxy-containing acrylic polymer was prepared from the following mixture of ingredients:

| Kettle Charge | |
|---|---|
| Ingredients | Parts by Weight |

| | -continued | |
|---|---|---|
| Butyl acetate | 906.0 | |

| | Charge I | |
|---|---|---|
| Ingredients | Parts by Weight (in grams) | Percentage By Weight |
| Glycidyl methacrylate | 510.0 | 30 |
| Methyl methacrylate | 595.0 | 35 |
| Butyl acrylate | 170.0 | 10 |
| Butyl methacrylate | 425.0 | 25 |
| Butyl acetate | 200 | |

| Ingredients | Parts by Weight (in grams) |
|---|---|
| | Charge II |
| VAZO 67 | 59.5 |
| Butyl acetate | 180.0 |
| | Charge III |
| VAZO 67 | 8.5 |
| Butyl acetate | 40.0 |

The kettle charge was heated in a suitable reactor to reflux to remove water through a Dean-Stark trap. Charges I and II were added simultaneously over the period of about three hours while maintaining the reaction mixture at reflux. At the conclusion of the addition of Charges I and II, the reaction mixture was held for one hour at reflux followed by the addition of Charge III over a 30-minute period. The reaction mixture was held at reflux for an additional hour followed by cooling to room temperature. The volatile materials in the reaction mixture were then removed by heating under vacuum to a solids content of 99.8 percent. The reaction product had a number average molecular weight of 4048.

EXAMPLE D

A polyacid half-ester of 1,6-hexanediol-methylhexahydrophthalic anhydride was prepared from the following mixture of ingredients:

| Ingredients | Parts by Weight (in grams) |
|---|---|
| 1,6-Hexanediol | 590.0 |
| Methylhexahydrophthalic anhydride | 1680.0 |
| Methyl isobutyl ketone | 972.9 |

The 1,6-hexanediol and the methyl isobutyl ketone were charged to a reaction vessel and heated under a nitrogen atmosphere to 115° C. The methylhexahydrophthalic anhydride was charged over a 2-hour period while maintaining the reaction temperature between 112°-117° C. The reaction mixture was held at this temperature for about 3 to 4 hours to a stalled acid value, i.e., acid value remained essentially constant. The reaction mixture was then cooled to room temperature and found to have a solids content measured at 110° C. of 68.0 percent and an acid value of 176.

EXAMPLE E

A polyacid half-ester of trimethylolpropane and methylhexahydrophthalic anhydride was prepared from the following mixture of ingredients:

| Ingredients | Parts by Weight (in grams) |
|---|---|
| Trimethylolpropane | 1341.0 |
| Methylhexahydrophthalic anhydride | 5040.0 |
| Methyl isobutyl ketone | 2734.7 |

The trimethylolpropane and the methyl isobutyl ketone were charged to a suitable reaction vessel and heated under a nitrogen atmosphere to 115° C. The methylhexahydrophthalic anhydride was charged over a 2-hour period while maintaining the temperature between 112°-117° C. The reaction mixture was held at this temperature for about 3 hours. The reaction product was then cooled to room temperature and found to have a solids content measured at 110° C. of 69 percent and an acid value of 200.3.

EXAMPLE F

An acid functional acrylic polymer was prepared from the following ingredients:

| | Kettle Charge | |
|---|---|---|
| Ingredients | Parts by Weight (in grams) | |
| Half-ester prepared as described in Example D | 2571.3 | |

| | Feed A | |
|---|---|---|
| Ingredients | Parts by Weight (in grams) | Percent |
| 2-Ethylhexyl acrylate | 2160 | 40 |
| Styrene | 1080 | 20 |
| Methacrylic acid | 1080 | 20 |
| Butyl methacrylate | 1053 | 19.5 |
| Methyl methacrylate | 27 | 0.5 |
| Di-tertiary-butyl peroxide | 54 | 1% based on monomers |

| | Feed | |
|---|---|---|
| Ingredients | Parts by Weight (in grams) | |
| Methyl isobutyl ketone | 1800 | |

The kettle charge was heated under a nitrogen atmosphere to reflux. Solvent was distilled and the reaction temperature increased to about 240° C. Feed A was added over a period of 30 minutes while maintaining the temperature between 187° and 200° C. At the completion of Feed A, the reaction mixture was held for 10 minutes at 189° C. Solvent was distilled until the reaction temperature reached 220° C. The reaction mixture was then cooled to 120° C. followed by thinning with Feed B. The reaction mixture was then cooled and found to have a solids content of 76.6 percent measured at 110° C., an acid value of 103.5 (theoretical 126) and a number average molecular weight of 840.

The following examples (1–6) show the preparation of various clear film-forming compositions prepared with the epoxy-containing acrylic polymers, the various polyacid half-esters and the acid functional acrylic polymer described above in Examples A through F. The coating compositions were then used in a color-plus-clear application.

EXAMPLE 1

A clear film-forming composition was prepared by mixing together the following ingredients:

| Ingredients | Parts by Weight (in grams) | Percent Resin Solids |
|---|---|---|
| TINUVIN 328[1] | 3.0 | 3.0 |
| Hexyl acetate[2] | 20.0 | — |
| Epoxy-containing acrylic polymer of Example A | 103.8 | 60.2 |
| 1,6-Hexanediol-methyl-hexahydrophthalic anhydride half-ester of Example D | 57.5 | 39.8 |
| DC-200 10 C.S.[3] (10% in xylene) | 1.0 | 0.1 |

-continued

| Ingredients | Parts by Weight (in grams) | Percent Resin Solids |
|---|---|---|
| ARMEEN DM 12D[4] | 2.0 | 2.0 |

[1]Substituted benzotriazole UV light stabilizer available from Ciba-Geigy Corporation.
[2]EXXATE 600 from Exxon Company.
[3]Silicone fluid available from the Dow Corning Corporation.
[4]N,N—dimethyldodecylamine catalyst available from AKZO Chemical.

The formulated coating composition contained 56 percent by weight resin solids and had a No. 4 Ford cup viscosity of 26.3 seconds.

EXAMPLE 2

A clear film-forming composition, similar to Example 1 but including methylhexahydrophthalic anhydride as a cure promoter, was prepared from the following mixture of ingredients:

| Ingredients | Parts by Weight (in grams) | Percent Resin Solids |
|---|---|---|
| TINUVIN 328 | 3.0 | 3.0 |
| Hexyl acetate | 20.0 | — |
| Epoxy-containing acrylic polymer of Example A | 108.6 | 63.0 |
| 1,6-Hexanediol-methyl-hexahydrophthalic anhydride half-ester of Example D | 31.4 | 21.7 |
| DC-200 | 1.0 | 0.1 |
| ARMEEN DM 12D | 2.0 | 2.0 |
| Methylhexahydrophthalic anhydride | 15.3 | 15.3 |

The resultant coating composition contained 58 percent by weight resin solids and had a No. 4 Ford cup viscosity of 25 seconds.

EXAMPLE 3

A clear film-forming composition similar to Example 2 was prepared but with the trimethylolpropane-methylhexahydrophthalic anhydride half-ester of Example E and also including the diglycidyl ether of cyclohexanedimethanol. The coating composition was prepared from the following ingredients:

| Ingredients | Parts by Weight (in grams) | Percent Resin Solids |
|---|---|---|
| TINUVIN 328 | 3.0 | 3.0 |
| Methyl ethyl ketone | 14.8 | — |
| DC-200 | 1.0 | 0.1 |
| Diglycidyl ether of cyclohexanedimethanol | 16.8 | 16.8 |
| Methylhexahydrophthalic anhydride | 16.5 | 16.5 |
| ARMEEN DM 12D | 2.0 | 2.0 |
| Epoxy-containing acrylic polymer of Example A | 72.3 | 41.6 |
| Trimethylolpropane-methyl-hexahydrophthalic anhydride half-ester of Example E | 35.3 | 25.1 |

The resultant formulated coating composition contained 65 percent resin solids and had a No. 4 Ford cup viscosity of 18.1 seconds.

EXAMPLE 4

A clear film-forming composition similar to Example 3 but including the acid functional acrylic polymer of Example F as a flow control agent was prepared from the following mixture of ingredients:

| Ingredients | Parts by Weight (in grams) | Percent Resin Solids |
|---|---|---|
| TINUVIN 328 | 3.0 | 3.0 |
| Methyl ethyl ketone | 17.7 | — |
| DC-200 | 1.0 | 0.1 |
| Diglycidyl ether of cyclohexanedimethanol | 16.8 | 16.8 |
| Methylhexahydrophthalic anhydride | 16.5 | 16.5 |
| ARMEEN DM 12D | 2.0 | 2.0 |
| Epoxy-containing acrylic polymer of Example A | 64.5 | 37.4 |
| Trimethylolpropane-methyl-hexahydrophthalic anhydride half-ester of Example E | 21.6 | 14.7 |
| Acid-containing acrylic polymer of Example F | 18.6 | 14.5 |

The formulated coating composition contained 65 percent by weight resin solids and had a No. 4 Ford cup viscosity of 24.2 seconds.

EXAMPLE 5

A clear film-forming composition containing the silane group-containing, epoxy group-containing acrylic polymer of Example B and trimethylolpropane-methylhexahydrophthalic anhydride half-ester of Example E was prepared from the following ingredients:

| Ingredients | Parts by Weight (in grams) | Percent Resin Solids |
|---|---|---|
| TINUVIN 328 | 3.0 | 3.0 |
| Xylene | 16.7 | — |
| Hexyl acetate | 10.0 | — |
| Silane and epoxy group-containing acrylic polymer of Example B | 103.4 | 72.4 |
| Trimethylolpropane-methyl-hexahydrophthalic anhydride half-ester of Example E | 39.4 | 27.6 |
| DC-200 | 1.0 | 0.1 |
| Dibutyltin dilaurate | 3.0 | 3.0 |
| Tetrabutylammonium bromide (25% by weight in butanol) | 30.0 | 7.5 |

EXAMPLE 6

A pigmented base coat composition containing aluminum flake pigmentation, the epoxy-containing acrylic polymer of Example A and the 1,6-hexanediol-methylhexahydrophthalic anhydride half-ester of Example D was prepared from the following mixture of ingredients:

| Ingredients | Parts by Weight (in grams) | Resin Solids | Pigment Solids |
|---|---|---|---|
| TINUVIN 328 | 3.0 | 3.0 | |
| Hexyl acetate | 60.9 | — | |
| Flow control agent[1] | 45.4 | 20.0 | |
| Epoxy-containing acrylic polymer of Example A | 81.4 | 47.2 | |
| 1,6-Hexanediol-methyl-hexahydrophthalic anhydride half-ester of Example D | 47.5 | 32.8 | |
| ARMEEN DM 12D | 2.0 | 2.0 | |

| Ingredients | Parts by Weight (in grams) | Resin Solids | Pigment Solids |
|---|---|---|---|
| -continued | | | |
| Aluminum flake[2] | 15.4 | — | 10.0 |

[1]Polymeric microparticle prepared in accordance with Example 11 of U.S. Pat. No. 4,147,688.
[2]65 Percent by weight non-leafing aluminum flakes and hydrocarbon solvent available from Alcoa Company as L-7575.

The ingredients were mixed in the order indicated at low shear with good agitation to form the pigmented base coating composition.

The clear film-forming compositions of Examples 1–5 were applied to both the pigmented base coat of Example 6 and to a light blue metallic water-based base coat to form color-plus-clear composite coatings over steel substrates. The light blue metallic base coat was available from Imperial Chemical Industries Ltd. as M-979. This product was prepared in accordance with the teachings of U.S. Pat. No. 4,403,003.

The base coats were spray applied by hand to steel panels at a temperature of about 25° C. A 3-minute flash at 180° F. (82° C.) was allowed between coats for the water-base base coat. The solvent-base base coat was given a 90-second flash at ambient conditions. The total film thickness for the base coat of Example 6 was about 0.6 mil and for the water-base base coat about 0.3 mil.

After application of the second base coat, two coats of the various clear coat compositions described in Examples 1–5 were spray applied with an automatic spraying device. The two coats were applied wet-on-wet to the basecoated panels with a 2-minute flash off at room temperature between the coats. After a final 2-minute flash off, the panels were then baked in both the horizontal and vertical positions (90° from horizontal unless otherwise indicated) at 250° F. (121° C.) for 30 minutes unless otherwise indicated. The properties of the composite coating are reported in the table below and are seen to have excellent gloss and distinctness of image.

| Ingredients | Parts by Weight (in grams) |
|---|---|
| TINUVIN 900[1] | 3.0 |
| IRGANOX 1010[2] | 1.0 |
| Benzoin | 0.5 |
| FC-430[3] | 1.0 |
| Trimethylolpropane-methyl-hexahydrophthalic anhydride half-ester of Example D[4] | 30.8 |
| Epoxy-containing acrylic polymer of Example C | 69.2 |

[1]Hindered UV light stabilizer available from Ciba Geigy Corp.
[2]Hindered phenol anti-oxidant available from Ciba Geigy Corp.
[3]Fluorocarbon surfactant available from the 3M Corp.
[4]Solvent stripped to 99.8 percent solids.

The ingredients mentioned above were blended together in a planetary mixer, extruded, chilled on a chill roll, flaked and ground into a fine powder in a micromill and then passed through a 100-mesh screen to form the final powder coating composition.

The powder coating composition was applied to the base coat of Example 6. The base coat was spray applied by hand to steel panels at a temperature of 25° C. Two coats were applied with a 90-second flash at ambient conditions between coats. The total film thickness was 0.6 mil. After application of the second base coat, two coats of the clear powder coating composition were electrostatically sprayed onto the base coat via a wet-on-wet application. The composite coating was then baked at 350° F. (177° C.) for 30 minutes. The clear coat had a thickness of 2.6 mils, a 20° gloss of 80, a DOI of 45 and a crosshatch adhesion value of 5, a Tukon hardness number of 10.0 and good solvent resistance.

We claim:

1. A process for applying a composite coating to a substrate which comprises applying to the substrate a colored film-forming composition to form a base coat and applying to said base coat a clear film-forming composition to form a transparent top coat over the base coat comprising as the clear film-forming composi-

TABLE

Properties of Color + Clear Coatings

| | | | | | | | | | |
|---|---|---|---|---|---|---|---|---|---|
| Base Coat | Ex. 6 | Ex. 6 | Ex. 6 | Ex. 6 | Water Base | Water Base | Water Base | Water Base | Water Base |
| Clear Coat | Ex. 1 | Ex. 2 | Ex. 3 | Ex. 4 | Ex. 1 | Ex. 2 | Ex. 3 | Ex. 4 | Ex. 5[7] |
| Clear Coat Film Thickness in mils | 1.7 | 1.6 | 1.8 | 1.5 | 1.7 | 1.6 | 1.8 | 1.5 | 2.1 |
| 20° Gloss[1] Horizontal/Vertical | 88/88 | 89/88 | 89/89 | 90/89 | 88/87 | 88/88 | 88/87 | 89/88 | 86 |
| DOI[2] Horizontal/Vertical | 85/75 | 85/75 | 95/70 | 90/70 | 85/80 | 90/85 | 100/85 | 95/90 | 70 |
| Adhesion[3] | 2 | 1–2 | 5 | 5 | 5 | 5 | 5 | 5 | — |
| Tukon Hardness Number[4] | — | — | — | — | 2.15 | 7.26 | 8.24 | 5.75 | 3–4 |
| Solvent Resistance[5] | poor | fair | good | good | — | — | — | — | good |
| Sag Resistance[6] | good | good | poor | good | good | excellent | poor | good | — |

[1]Measured with a 20 degree gloss meter manufactured by Gardner Instrument Company. Measurements were made on the panels which were baked in both the vertical and horizontal positions.
[2]Determined on Dori-Gon Meter D47-6 manufactured by Hunter Laboratories.
[3]Crosshatch adhesion determined by ASTM D-3359.
[4]Determined by ASTM E-384.
[5]Solvent resistance determined by rubbing with normal hand pressure back and forth (double rub) with a xylene-saturated cloth. A good rating was given if the coating withstood 20 double rubs without marring the surface. A fair rating was given for a marred surface, and a poor rating was given when the coating was completely removed.
[6]Sag resistance was determined on the panels which were baked in the vertical position. An excellent rating indicated essentially no sagging or dripping of the coating. Sag is indicated by a considerably thicker film developing on the bottom of the panel. A good rating indicated some sagging. A poor rating indicated heavy sagging or dripping.
[7]Gloss and DOI for this example measured after the clear coat was cured in the horizontal position for 30 minutes at 180° F. (82° C.).

EXAMPLE 7

A clear film-forming powder coating composition was prepared by mixing together the following ingredients:

tion and/or as the colored film-forming composition a crosslinkable composition comprising a polyepoxide and a polyacid curing agent which is a half-ester formed from reacting an acid anhydride with a polyol; there being from 0.3 to 3 equivalents of acid for each equivalent of epoxy.

2. The process of claim 1 in which the crosslinkable composition is used as the clear film-forming composition.

3. The process of claim 1 in which the polyepoxide is a copolymer of a monoethylenically unsaturated monomer having at least one epoxy group and at least one monoethylenically unsaturated monomer which is free of epoxy groups.

4. The process of claim 3 in which the copolymer has a number average molecular weight of between 500 and 20,000.

5. The process of claim 4 in which the copolymer is a copolymer of glycidyl acrylate or methacrylate with at least one other copolymerizable ethylenically unsaturated monomer.

6. The process of claim 5 in which the other copolymerizable ethylenically unsaturated monomer comprises at least in part an alkyl ester of acrylic or methacrylic acid containing from 1 to 20 carbon atoms in the alkyl group.

7. The process of claim 5 in which the glycidyl acrylate or methacrylate comprises from 5 to 60 percent of the monomers used in preparing the epoxy-containing acrylic polymer.

8. The process of claim 3 in which the epoxy group-containing acrylic polymer is present in the crosslinkable composition in amounts of 10 to 90 percent by weight based on total weight of resin solids.

9. The process of claim 1 in which the crosslinkable composition contains hydrolyzable silane groups.

10. The process of claim 3 in which the crosslinkable composition contains hydrolyzable silane groups in the epoxy-containing acrylic polymer.

11. The process of claim 1 in which the half-ester is of the structure:

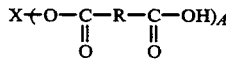

where X is the residue of a polyol after reaction with the 1,2-dicarboxylic acid anhydride, R is an organic moiety associated with the anhydride, and A is equal to at least 2.

12. The process of claim 11 in which the polyol is a diol, triol, or mixture thereof.

13. The process of claim 12 in which the polyol is selected from the class consisting of trimethylolpropane, neopentyl glycol and 1,6-hexanediol.

14. The process of claim 11 in which the 1,2-dicarboxylic acid anhydride is selected from the class consisting of hexahydrophthalic anhydride and alkyl-substituted hexahydrophthalic anhydrides.

15. The process of claim 1 in which the half-ester is present in amounts of 10 to 90 percent by weight based on total weight of resin solids.

16. The process of claim 1 in which the crosslinkable composition contains an acid functional acrylic polymer.

17. The process of claim 16 in which the acid functional acrylic polymer has a number average molecular weight of 500 to 5000.

18. The process of claim 16 in which the acid functional acrylic polymer is prepared from a mixture of acrylic monomers which includes from 10 to 60 percent by weight of an acid functional acrylic monomer; the percentage by weight being based on total weight of acrylic monomers.

19. The process of claim 16 in which the acid functional acrylic polymer is present in the crosslinkable composition in amounts of from 0 to 50 percent by weight, based on total weight of resin solids.

20. The process of claim 1 in which the crosslinkable composition contains an anhydride.

21. The process of claim 20 in which the anhydride is a liquid at 25° C.

22. The process of claim 21 in which the anhydride is an alkyl hexahydrophthalic anhydride.

23. The process of claim 20 in which the anhydride is present in amounts of 0 to 40 percent by weight based on total weight of resin solids.

24. The process of claim 1 in which the crosslinkable composition has a resin solids content of at least 50 percent.

25. A substrate coated in accordance with the process of claim 1.

26. A substrate coated in accordance with the process of claim 16.

27. A substrate coated in accordance with the process of claim 20.

* * * * *